United States Patent [19]
Mead

[11] Patent Number: 5,680,454
[45] Date of Patent: Oct. 21, 1997

[54] METHOD AND SYSTEM FOR ANTI-PIRACY USING FRAME RATE DITHERING

[75] Inventor: Donald C. Mead, Carlsbad, Calif.

[73] Assignee: Hughes Electronics, Los Angeles, Calif.

[21] Appl. No.: 511,123

[22] Filed: Aug. 4, 1995

[51] Int. Cl.$^6$ .............................. H04L 9/00; H04N 7/167
[52] U.S. Cl. .................. 380/14; 380/9; 380/10; 380/20; 380/48
[58] Field of Search ........................ 380/3, 4, 5, 9, 380/10, 14, 20, 48, 49

[56] References Cited

U.S. PATENT DOCUMENTS 3,958,077  5/1976  Ross et al. ..................... 380/14 X

OTHER PUBLICATIONS

E. Kranakis, *Primality and Cryptography*; (John Wiley & Sons; New York; 1986; Section 4.1, pp. 98–99).

*Primary Examiner*—Bernarr E. Gregory
*Attorney, Agent, or Firm*—P. Y. Price; T. Gudmestad; W. K. Denson-Low

[57] ABSTRACT

A method and system of displaying an image sequence containing a plurality of image frames to inhibit an unauthorized duplication thereof by a camera. The method includes steps of generating a pseudo-random noise sequence, and displaying the image sequence at a frame rate which is varied for successive pairs of the image frames in dependence upon the pseudo-random noise sequence. The frame rate is varied within a predetermined range about a nominal frame rate for the image sequence such that the variations are imperceptible by a human observer. The system includes a pseudo-random sequence generator (30) which generates the pseudo-random noise sequence, and a display device (36) to display the image sequence at a frame rate which is varied in dependence upon the pseudo-random noise sequence.

2 Claims, 2 Drawing Sheets

METHOD AND SYSTEM FOR ANTI-PIRACY USING FRAME RATE DITHERING

TECHNICAL FIELD

The present invention relates to methods and systems for inhibiting unauthorized duplication of image sequences.

BACKGROUND ART

There are various known methods and systems to prevent unauthorized duplication of video image sequences. Many of these known methods and systems are utilized to prevent an unauthorized duplication of a video recording (such as a movie on a video cassette) using a video recording device electrically connected to a video playback device. These methods and systems inhibit potential video pirates from copying the contents of a video cassette using commercially-available video cassette recorders (VCRs), wherein the audio and video output jacks on a first VCR (which plays the video cassette) are electrically connected to the audio and video input jacks on a second VCR (which records onto another video cassette).

A cruder form of unauthorized duplication can be performed using a camera (such as a commercially-available camcorder) to capture and record a video image sequence being displayed on a display device. In some areas of the world, this form of video piracy is practiced for copying movies directly from a viewing screen. In particular, a video pirate synchronizes the shutter of his/her camcorder with the mechanical shutter of a mechanical film projector utilized to display the image sequence on the viewing screen. Although the quality of the unauthorized copy may be poor, this type of piracy has not been prevented heretofore since the camcorder generally sees what a human vision system sees.

SUMMARY OF THE INVENTION

It is an object of the present invention to inhibit an unauthorized duplication of a displayed image sequence using a camera and video recorder.

A further object of the present invention is to inhibit an unauthorized duplication of a displayed image sequence without significantly affecting the perception thereof by a viewer.

In carrying out the above objects, the present invention provides a method of inhibiting an unauthorized duplication during a display of an image sequence, wherein the image sequence has a plurality of image frames. The method comprising a step of generating a pseudo-random noise sequence. The method further comprises a step of displaying the image sequence at a frame rate which is varied for successive pairs of the image frames, wherein the frame rate is varied in dependence upon the pseudo-random noise sequence.

Further in carrying out the above objects, the present invention provides a system for inhibiting an unauthorized duplication of a display of an image sequence, wherein the image sequence has a plurality of image frames. A pseudo-random sequence generator generates a pseudo-random noise sequence used to control the frame rate of a display device. The display device displays the image sequence at a frame rate which is varied in dependence upon the pseudo-random noise sequence for successive pairs of the image frames.

In preferred embodiments, the frame rate is varied within a predetermined range about a nominal frame rate for the image sequence so that the variations are imperceptible by a human observer.

By varying the frame rate pseudo-randomly, embodiments of the present invention are advantageous in preventing a potential video pirate from synchronizing a camcorder to the display of the image sequence. The resulting video recorded from the display of the image sequence lacks vertical synchronization, and hence, is unwatchable.

These and other features, aspects, and advantages of the present invention will become better understood with regard to the following description, appended claims, and accompanying drawings.

BEST MODE(S) FOR CARRYING OUT THE INVENTION

Figure 1:
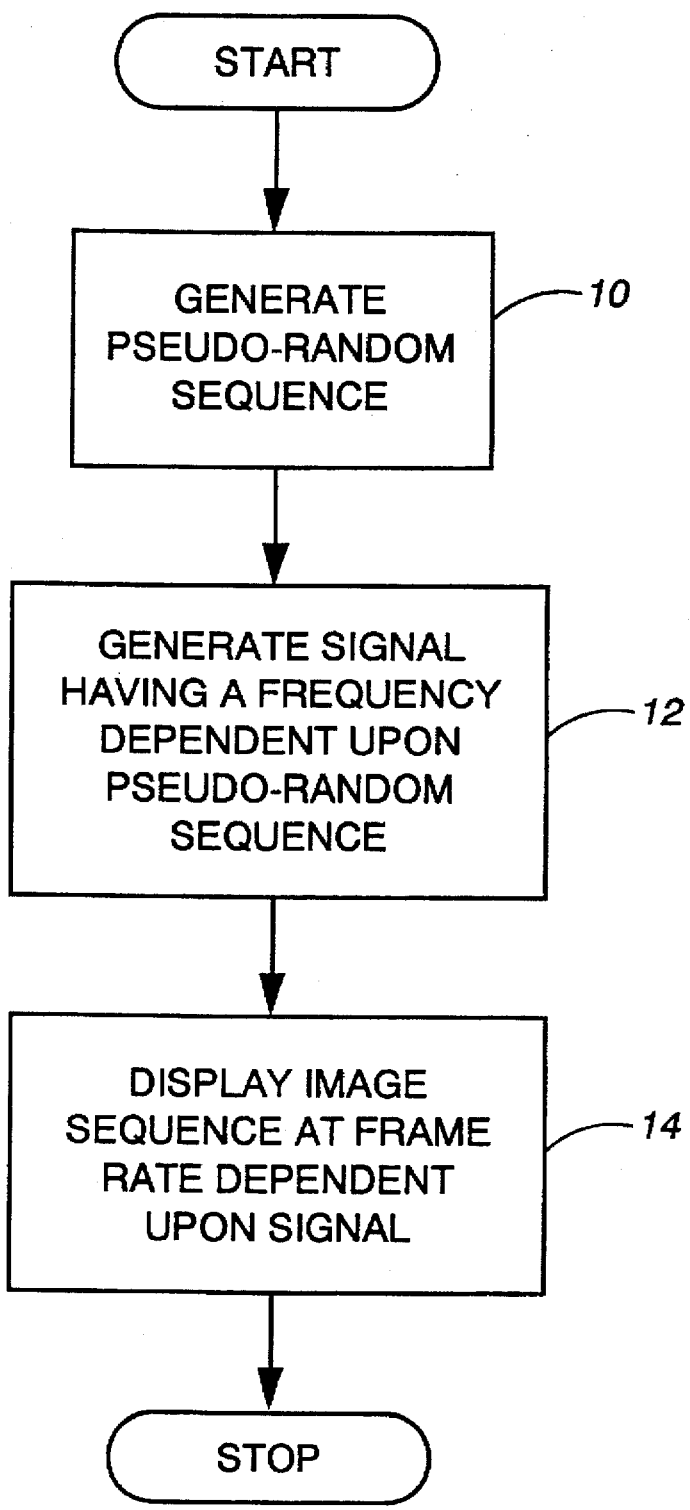
FIG. 1 is a flow chart of an embodiment of a method of displaying an image sequence to inhibit an unauthorized duplication thereof by a camera.

A flow chart of an embodiment of a method of displaying an image sequence to inhibit an unauthorized duplication thereof by a camera is illustrated in FIG. 1. The method includes a step of generating a pseudo-random noise sequence, as indicated by block 10. The pseudo-random noise sequence is based upon a pseudo-random digital key which is periodically repeated within the sequence. By repeating the pseudo-random key, the sequence provides a deterministic sequence which resembles a stochastic or random sequence.

The method further includes a step of generating an electrical signal having a frequency dependent upon the pseudo-random noise sequence, as indicated by block 12. The electrical signal may be in the form of a pulsed signal having a varying time interval between successive pulses. Each time interval is dependent upon the state of the pseudo-random noise sequence at some instance in time.

The steps indicated by blocks 10 and 12 may be performed in a similar manner as a transmitter in a frequency-hopped spread spectrum system. Embodiments of such a transmitter are disclosed in "Spread Spectrum Systems," 2nd Edition, by Robert C. Dixon, pp. 126–139.

As indicated by block 14, the method further includes a step of displaying the image sequence at a frame rate which is varied for successive pairs of the image frames. In particular, the frame rate is varied in dependence upon the pseudo-random noise sequence, and more particularly, in dependence upon the electrical signal.

It is preferred that the variations in the frame rate be small enough to be substantially imperceptible by a human observer. It is known that the human vision system is relatively insensitive to small frame rate variations, e.g., it is standard to directly telecine film at 24 frames per second into a PAL format at 25 frames per second without utilizing any time base correction. Hence, for an image sequence whose nominal frame rate is 24 frames per second, it is preferred that the frame rate be pseudo-randomly varied within a range having a lower bound of 22 frames per second and an upper bound of 26 frames per second. To make the variations even less perceptible, the frame rate can be pseudo-randomly varied within a range of 23 frames per second to 25 frames per second.

For a general nominal frame rate for the image sequence, it is preferred that the frame rate be pseudo-randomly varied within 10 percent of the nominal frame rate, and within 5 percent to make the variations less perceptible.

Further, it is preferred that the pseudo-random sequence be constrained in a manner to prevent the video sequence from significantly diverging from the nominal frame rate. This is desired in order to provide adequate correlation between the video sequence and an associated audio track. For this purpose, the pseudo-random sequence may be constrained to provide an average frame rate equal to the nominal frame rate over either a predetermined number of frames or a predetermined time period. For example, the pseudo-random sequence may be constrained to provide an average frame rate of 24 frames per second over successive time periods of 0.5 seconds. Alternatively, each pseudo-randomly generated number in the sequence can be formed in accordance with a probability density function which is dependent upon the average frame rate produced by the previous pseudo-randomly generated numbers. For example, the probability density function can be modified when the average frame rate approaches either the upper bound or lower bound of the frame rate range so that the average frame rate is contained within the range.

Figure 2:
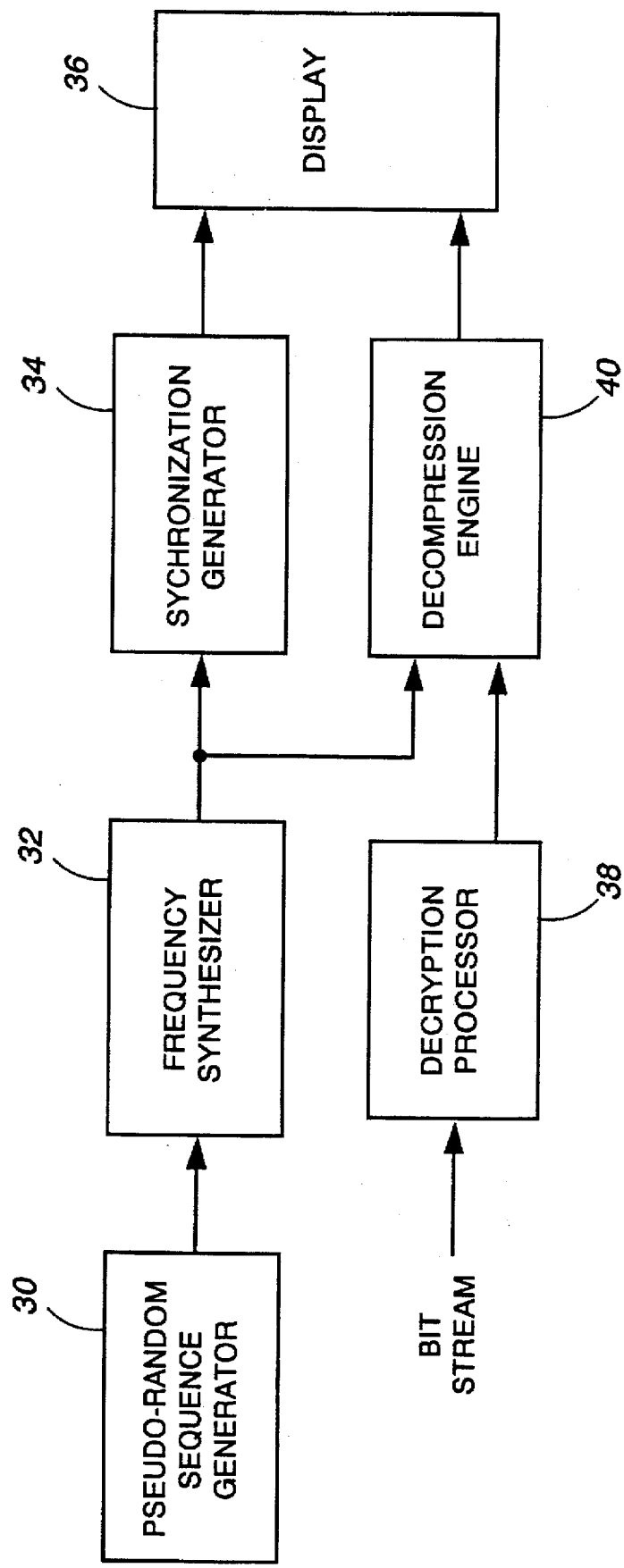
FIG. 2 is a block diagram of an embodiment of a system for displaying an image sequence to inhibit an unauthorized duplication thereof by a camera.

FIG. 2 shows a block diagram of an embodiment of a system for displaying an image sequence to inhibit an unauthorized duplication thereof by a camera. The system includes a pseudo-random sequence generator 30 which generates a pseudo-random noise sequence. The pseudo-random noise sequence may be in the form of either a digital signal or an analog signal.

The system further includes a frequency synthesizer 32 responsive to the pseudo-random sequence generator 30. The frequency synthesizer 32 generates an electrical signal having a frequency dependent upon the pseudo-random noise sequence. The electrical signal is typically in the form of either an oscillatory signal or a pulsed signal having a varying frequency or varying time interval between successive pulses dependent upon the state of the pseudo-random noise sequence. It is preferred that the frequency of the electrical signal be pseudo-randomly varied within 10 percent of a nominal frequency, or within 5 percent of the nominal frequency to make display variations less perceptible.

Alternatively, the frequency synthesizer 32 may produce an electrical signal having a frequency which is pseudo-randomly varied between a multiple of 22 frames per second and a multiple of 26 frames per second for an image sequence having a nominal frequency of a multiple of 24 frames per second. For reasons described earlier, the frequency may be pseudo-randomly varied between a multiple of 23 frames per second and a multiple of 25 frames per second instead. The multiples of the above-specified rates may be utilized to minimize flicker, wherein each frame is repeatedly displayed a predetermined number of times. For example, film shot at 24 frames per second is often displayed at 48 frames per second (each frame is displayed twice) or 72 frames per second (each frame is displayed three times).

In a preferred embodiment, the pseudo-random sequence generator 30 and the frequency synthesizer 32 are similar to a transmitter for a frequency-hopping spread spectrum system, such as those disclosed on pages 126–139 of the "Spread Spectrum Systems" reference.

The system further includes a synchronization generator 34 responsive to the frequency synthesizer 32. Based upon the signal generated by the frequency synthesizer 32, the synchronization generator 34 generates a synchronization signal to synchronize the display of the image frames using a display device 36. Although not necessary, the synchronization signal may be in accordance with a television display standard, such as NTSC, PAL, or SECAM.

The display device 36 can include an electronic projector system, a mechanical projector system, a cathode-ray tube, or a liquid crystal display, for example, to display the image sequence. Using the described system, the display device 36 displays the image sequence at a frame rate which is pseudo-randomly varied for successive pairs of the image frames.

In some applications, a digitized movie (which is to be displayed) is received in the form of a compressed, encrypted digital bit stream. In these applications, the encryption is removed by a decryption processor 38, and the resulting bit stream is fed into a decompression engine 40. The decompression engine 40 recovers an image sequence contained within the bit stream. The decompression engine 40 produces a signal representative of a subsequent image frame upon received a clocking signal from the frequency synthesizer 32.

Embodiments of the present invention have many advantages. By varying the frame rate pseudo-randomly, embodiments of the present invention are advantageous in preventing a potential video pirate from synchronizing a camcorder to the display of the image sequence. The resulting video recorded from the display of the image sequence lacks vertical synchronization, and hence, is unwatchable. Further, by pseudo-randomly varying the frame rate within a limited range, the use of the system is imperceptible by a human observer.

It is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A system for displaying an image sequence to inhibit an unauthorized duplication thereof by a camera, the image sequence having a plurality of image frames, the system comprising:

a pseudo-random sequence generator Which generates a pseudo-random noise sequence;

a display device responsive to the pseudo-random sequence generator, the display device to display the image sequence at a frame rate which is varied for successive pairs of the image frames, wherein the frame rate is varied in dependence upon the pseudo-random noise sequence;

a frequency synthesizer responsive to the pseudo-random sequence generator to generate an electrical signal having a frequency dependent upon the pseudo-random noise sequence; and a synchronization generator responsive to the frequency synthesizer to generate a synchronization signal based upon the electrical signal wherein the display device is synchronized using the synchronization signal.

2. The system of claim 1 wherein a decompression engine decompresses a compressed signal to recover the image sequence, and wherein the frequency synthesizer commands the decompression engine to successively apply the image frames to the display device at the frame rate dictated by the electrical signal.

* * * * *